(12) United States Patent  (10) Patent No.: US 6,357,786 B1
Higashi                    (45) Date of Patent: Mar. 19, 2002

(54) AIR BAG SYSTEM

(75) Inventor: Yosuke Higashi, Tochigi-Ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 09/634,680

(22) Filed: Aug. 8, 2000

(30) Foreign Application Priority Data

Aug. 9, 1999 (JP) .......................................... 11-225441

(51) Int. Cl.$^7$ .............................................. B60R 21/16
(52) U.S. Cl. .................................. 280/728.2; 280/743.1
(58) Field of Search .......................... 280/743.1, 730.2, 280/732, 728.2

(56) References Cited

U.S. PATENT DOCUMENTS 5,913,535 A * 6/1999 Taguchi et al.
6,076,850 A * 6/2000 Kreuzer et al.

FOREIGN PATENT DOCUMENTS

JP        11115673       4/1999

* cited by examiner

Primary Examiner—Paul N. Dickson
(74) Attorney, Agent, or Firm—Dann, Dorfman, Herrell and Skillman, P.C.

(57) ABSTRACT

There is provided an air bag system in which leakage of gas generated by an inflator through an insertion opening formed at a mounting base portion of an air bag is prevented reliably. The air bag system has the air bag in which the inflator for generating gas for inflating and deploying the air bag is mounted through the insertion opening formed at the mounting base portion of said air bag. The air bag system has an applied cloth mounted to an outside of the air bag such that the insertion opening for the inflator is covered with the applied cloth by making one side of the applied cloth an open hole and fixing edges of three other sides of the applied cloth to an outside face of the mounting base portion.

8 Claims, 7 Drawing Sheets

AIR BAG SYSTEM

BACKGROUND OF THE INVENTION

1. Field of the Invention

The present invention relates to an air bag system having an air bag in which an inflator for generating gas is mounted inside through an insertion opening provided to a mounting base portion of the air bag and mainly to an improvement of an air bag structure for preventing leakage of gas generated by the inflator through the insertion opening for the inflator.

2. Description of the Related Art

As an air bag system for protecting a passenger, there is proposed a system in which an inflator for generating gas is mounted to an inside through an insertion opening provided to a mounting base portion of an air bag and a closing cloth with which the insertion opening for the inflator is covered is provided to an outside of the air bag so as to prevent leakage of gas through the insertion opening for the inflator to the outside of the air bag (Japanese Patent Application Laid-open No. 11-115673).

In the air bag system, a side of the closing cloth is sewn on the outside face of the air bag and the closing cloth is pulled to the mounting base portion of the air bag so as to cover the insertion opening for the inflator with the closing cloth. In this air bag system, if the gas generated from the inflator acts on the closing cloth through the insertion opening of the mounting base portion, the closing cloth bulges away from the outside face of the air bag. Therefore, there is a fear of leakage of the gas from unsewed edge sides of the closing cloth.

In the air bag system, a reinforcing cloth having an opening corresponding to the insertion opening for the inflator is provided to an inside of the air bag in addition to the closing cloth. However, it is impossible to prevent the gas generated from the inflator from acting toward the closing cloth through the insertion opening of the mounting base portion even though the reinforcing cloth is provided.

It is a main object of the present invention to provide an air bag system for reliably preventing leakage of gas generated from an inflator through an insertion opening provided to a mounting base portion of an air bag.

SUMMARY OF THE INVENTION

In an air bag system according to a first aspect of the invention, the air bag system has an air bag in which an inflator for generating gas is mounted through an insertion opening formed at a mounting base portion of the air bag and the air bag system has an applied cloth mounted to an outside of the air bag such that the insertion opening for the inflator is covered with the applied cloth by making one side of the applied cloth an open hole and fixing edges of three other sides of the applied cloth to an outside face of the mounting base portion.

In an air bag system according to a second aspect, the open hole is capable of being opened into an openmouthed shape.

In an air bag system according to a third aspect, the applied cloth is mounted to the outside of the air bag such that the open hole on the one side is positioned on a side held by the inflator mounted in the air bag.

DESCRIPTION OF THE PREFERRED EMBODIMENT

Figure 1:
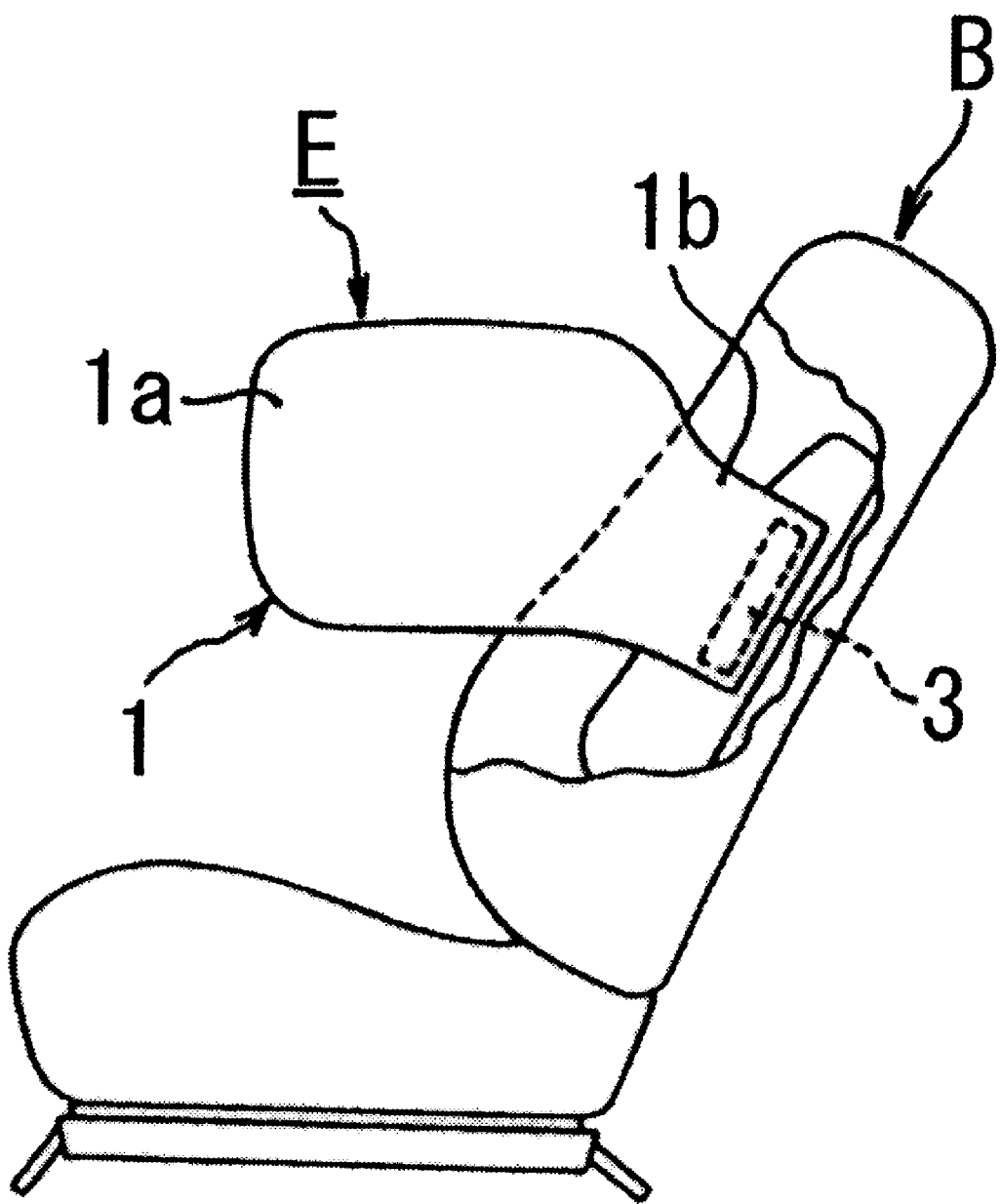
FIG. 1 is an explanatory view showing an air bag in an inflated and deployed state in a partially cutaway side view of an automobile seat having an air bag system according to the present invention.

An embodiment of the invention will be described below by reference to the accompanying drawing. The illustrated embodiment forms an air bag system E mounted to a left side of a seat back B of a front passenger seat as shown in FIG. 1.

Figure 2:
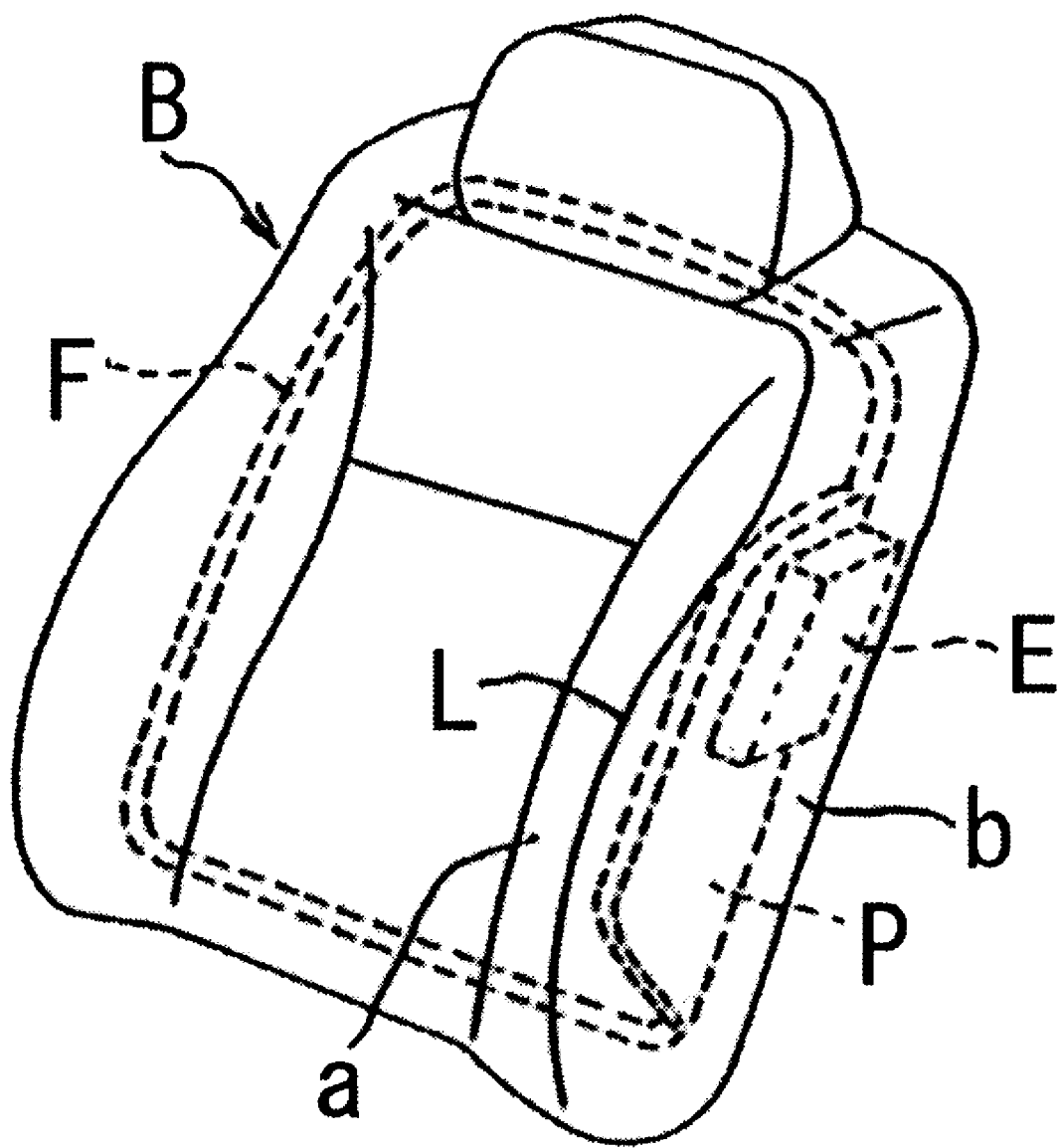
FIG. 2 is a perspective view showing a seat back of the automobile seat having the air bag system according to the invention.
Figure 3:
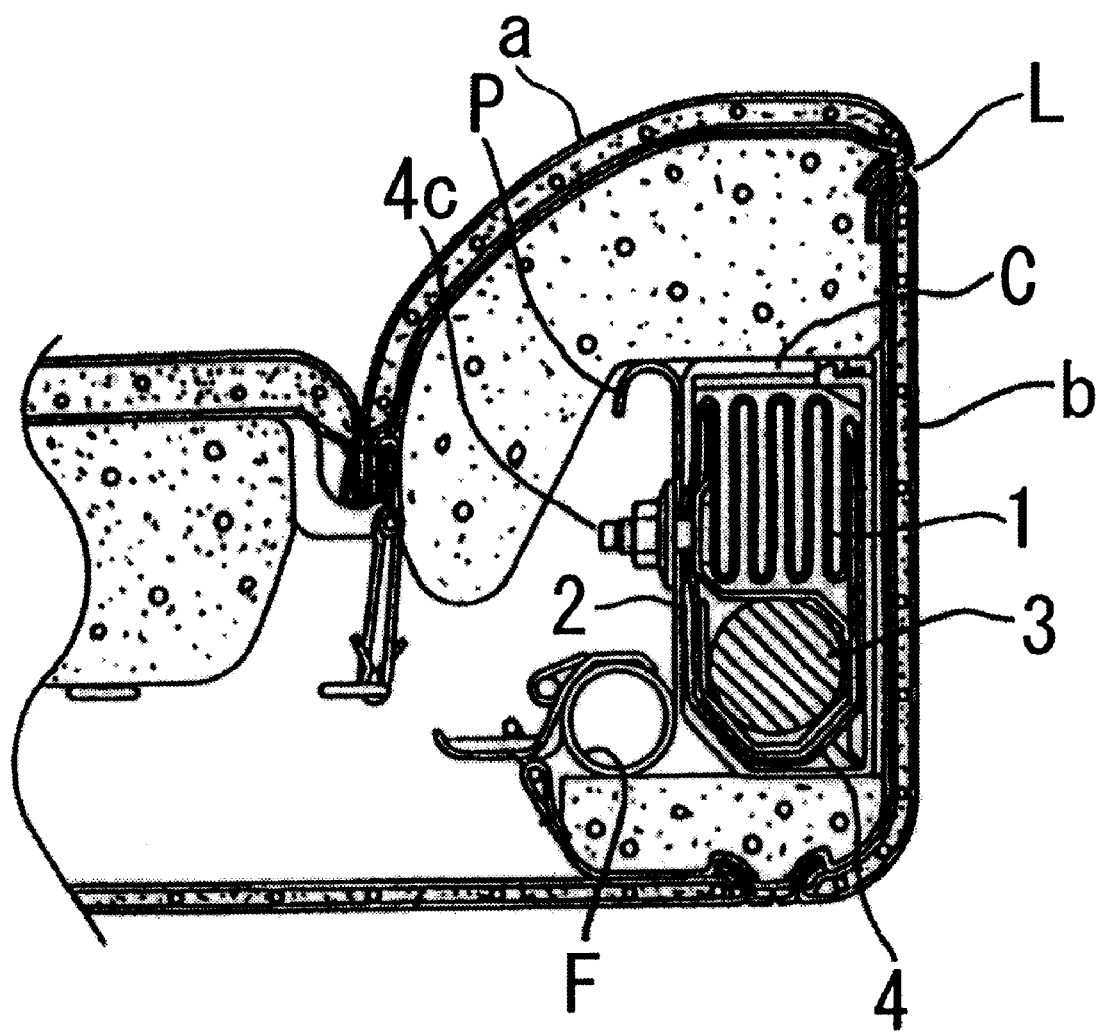
FIG. 3 is a partial sectional view of the seat back of the automobile seat having the air bag system according to the invention.

As shown in FIGS. 2 and 3, the air bag system E is mounted in the seat back B by folding an air bag 1 such that the air bag 1 can be inflated and deployed, housing the air bag 1 in an air bag case C that can be opened by inflation pressure of the air bag 1, and bolting the air bag case C to a side plate P of a seat back frame F by using the air bag case C as a base. A seam L between a front cover portion a with which a bank portion of the seat back B is covered and a side cover portion b becomes a rupture portion at which rupture takes place as a result of inflation and deployment of the air bag 1.

Figure 4:
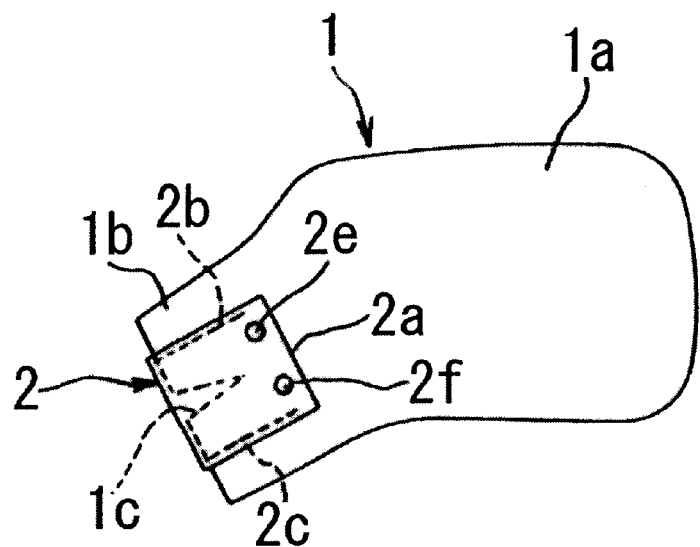
FIG. 4 is one-side view of a deployed air bag mounted to the air bag system according to the invention.

As shown in FIG. 4, the air bag 1 is formed by sewing a bag main body 1a folded such that the bag main body 1a can be inflated and deployed and a mounting base portion 1b having a narrower width than the bag main body 1a into a bag shape. In the air bag 1 an insertion opening 1c used for mounting an inflator that will be described later to an inside is provided to the mounting base portion 1b. The insertion opening 1c is formed of a slit or the like that extends from a substantially center portion of the mounting base portion 1b toward faces of the bag main body 1a on opposite sides of the mount base portion 1.

Figure 5:
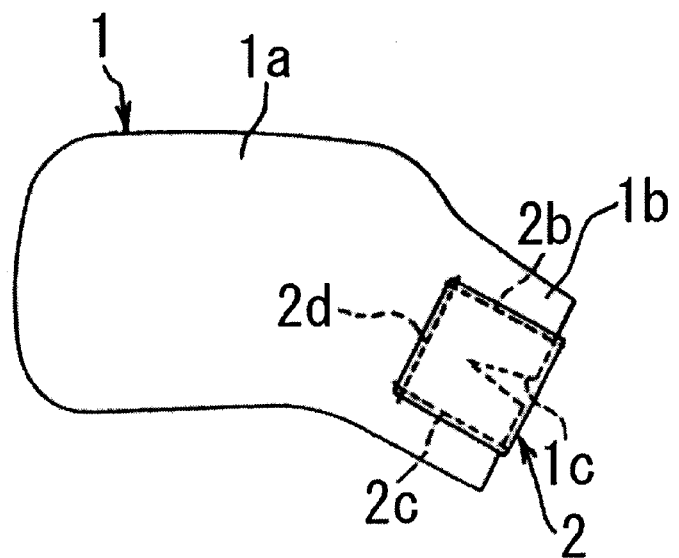
FIG. 5 is the-other-side view of the deployed air bag mounted to the air bag system according to the invention.

As shown in FIGS. 4 and 5, an applied cloth 2 with which the insertion opening 1c for the inflator is covered is fixed to an outside of the air bag 1 for preventing leakage of the gas such that one side of the cloth 2 provides an open hole 2a and the edges of three other sides 2b, 2c, and 2d are sewn on an outside face of the mounting base portion 1b.

The applied cloth 2 is formed by cutting cloth material which is similar to material of the air bag 1 and which does not leak gas. The applied cloth is a band-shaped member that is longer than at least the insertion opening 1c extending from the substantially center portion of the mounting base portion 1b toward the faces of the bag main body 1a on the opposite sides of the mounting base portion 1b.

Figure 6:
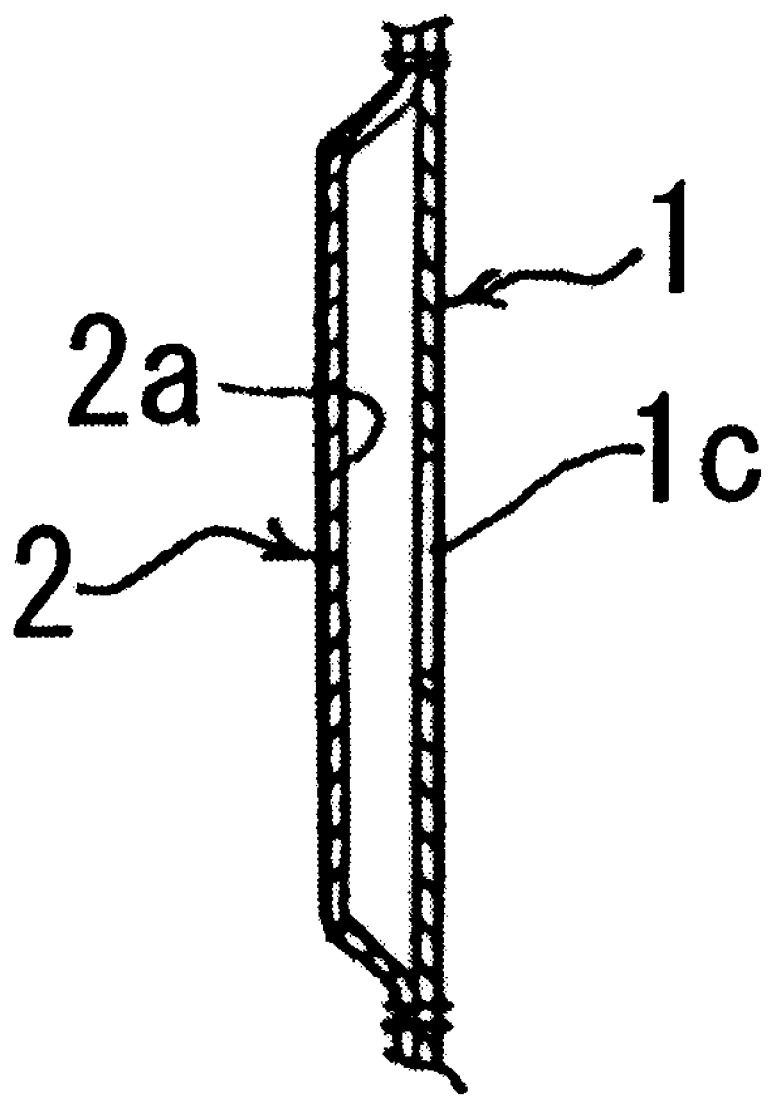
FIG. 6 is a sectional view partially showing an insertion opening and an applied cloth of the air bag mounted to the air bag system according to the invention.

As shown in FIG. 6, the one side of the applied cloth 2 is preferably formed to provide the open hole 2a so that it can be opened into an openmouthed shape and the applied cloth 2 is preferably mounted to the outside of the air bag 1 such that the insertion opening 1c for the inflator is covered with the applied cloth 2. The applied cloth 2 is preferably mounted to the outside of the air bag 1 by positioning the open hole 2a on the one side of the applied cloth 2 on a side held by the inflator which is mounted in the air bag 1 and which will be described later.

Figure 7:
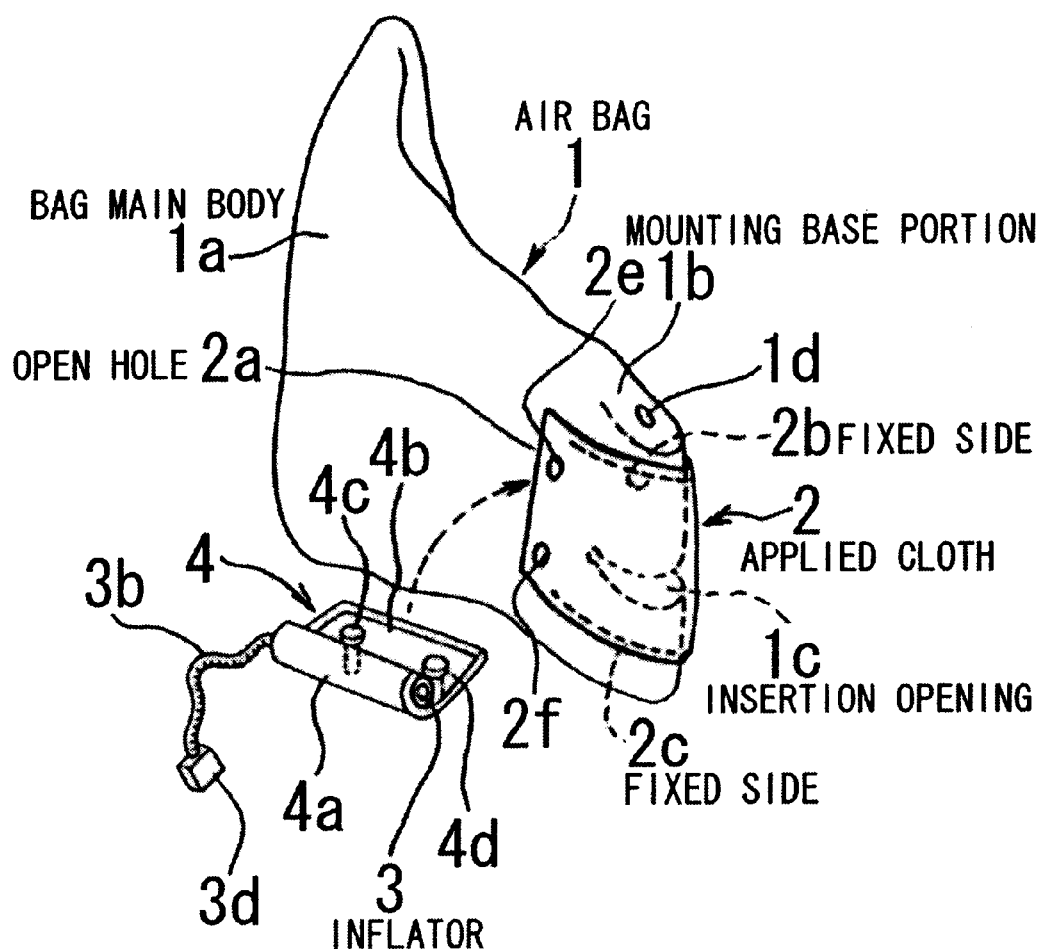
FIG. 7 is an explanatory view showing the air bag system according to the invention in terms of an inflator mounting step.
Figure 8:
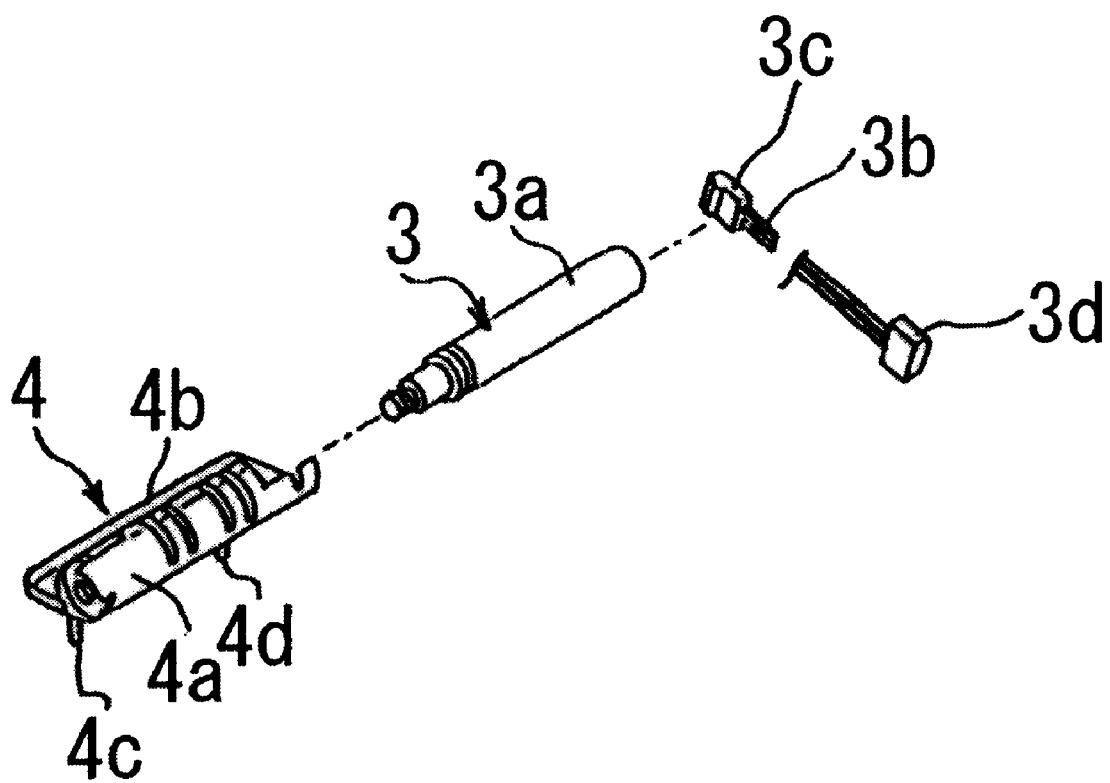
FIG. 8 is an exploded perspective view of the inflator and a retainer mounted to the air bag system according to the invention.

In the air bag 1, the inflator 3 as shown in FIGS. 7 and 8 is mounted such that the inflator 3 is positioned at the mounting base portion 1b. The inflator 3 generates gas necessary to inflate and deploy the air bag 1 from an inflator main body 3a and has associated equipment such as a shock sensor and a harness 3b and connectors 3c and 3d necessary to form a circuit.

The inflator 3 is retained by the retainer 4 and mounted in the air bag 1 together with the retainer 4. The retainer 4 is formed of a holder potion 4a in which the inflator main body 3a is fitted and retained, a base plate portion 4b as a placing plate, and tightening bolts 4c and 4d affixed on the base plate portion 4b.

Because the tightening bolts 4c and 4d of the retainer 4 are affixed on the base plate portion 4b, the bolts 4c and 4d become fixed shafts of the inflator 3 together with the retainer 4. Through holes 2e and 2f (only those on the applied cloth are shown) which correspond to the tightening bolts 4c and 4d and through which the tightening bolts 4c and 4d are inserted are formed in a bottom face of the air bag case C, the mounting base portion 1b of the air bag 1, and the applied cloth 2.

In order to assemble the respective portions into the air bag system E, the inflator main body 3a is retained by the holder portion 4a of the retainer 4 and the inflator 3 excluding the harness 3b and connectors 3c and 3d is put in the air bag 1 through the insertion opening 1c provided to the mounting base portion 1b after opening the open hole 2a of the applied cloth 2. At this time, because the open hole 2a of the applied cloth 2 can be opened into an openmouthed shape, the inflator 3 can be easily put in the air bag 1 though the insertion opening 1c together with the retainer 4.

The tightening bolts 4c and 4d of the retainer 4 are inserted into the through holes 2e and 2f formed on the mounting base portion 1b of the air bag 1 and a side face of the applied cloth 2 such that the bolts 4c and 4d project outward. By connecting the harness 3b including the connector 3d to the inflator main body 3a through the connector 3d afterward from the outside of the air bag 1 through a through hole 1d (see FIG. 7) formed on a side portion of the air bag 1, the harness 3b is drawn to the outside.

The air bag system formed as described above is housed in the air bag case C by folding the air bag main body 1a such that the air bag main body 1a can be inflated and deployed and with the tightening bolts 4c and 4d of the retainer 4 projecting to the outside through the through holes formed on the bottom face. The air bag system is mounted in the seat back B by using the air bag case C as the base and bolting the air bag system to the side plate P of the seat back frame F through the tightening bolts 4c and 4d of the retainer 4.

In the air bag system, because the applied cloth 2 is mounted such that the insertion opening 1c for the inflator is covered with the applied cloth 2 by sewing the three sides 2b, 2c, and 2d excluding the open hole 2a on the one side of the applied cloth 2 on the outside face of the mounting base portion 1b, the insertion opening 1c for the inflator 3 can be closed more tightly with the applied cloth 2 and leakage of the gas from the insertion opening 1c can be prevented reliably even if the gas is generated by the inflator 3 and the gas pressure is received from the insertion opening 1c.

Furthermore, because the open hole 2a on the one side of the applied cloth is positioned on the side where the inflator 3 holds the mounting base portion 1b of the air bag 1, the open hole 2a as well as the mounting base portion 1b of the air bag 1 formed with the insertion opening 1c can be held by the holder portion 4a and the base plate portion 4b of the retained 4. Therefore, the insertion opening 1c for the inflator can be sealed more reliably and the mounting base portion 1b of the air bag 1 can be reinforced.

As described above, according to the air bag system of the first aspect of the invention, by mounting the applied cloth to the outside of the air bag such that the insertion opening for the inflator is covered with the applied cloth by making the one side of the applied cloth form the open hole and fixing the edges of the three other sides of the applied cloth to the outside face of the mounting base portion, it is possible to close the insertion opening for the inflator more tightly with the applied cloth when the gas is generated by the inflator, to reliably prevent leakage of the gas from the insertion opening for the inflator, and to reinforce the mounting base portion of the air bag with the applied cloth.

According to the air bag system of the second aspect of the invention, by mounting the applied cloth which has the open hole capable of being opened into the openmouthed shape and with which the insertion opening for the inflator is covered to the outside of the air bag, the inflator can be easily put in the air bag through the insertion opening.

According to the air bag system of the third aspect of the invention, by mounting the applied cloth to the outside of the air bag such that the open hole on the one side is positioned on the side held by the inflator mounted in the air bag, the insertion opening for the inflator can be sealed more reliably.

What is claimed is:

1. An air bag system having an air bag in which an inflator for generating gas is mounted through an insertion opening formed at a mounting base portion of said air bag, said air bag system having an applied cloth mounted to an outside of said air bag such that said insertion opening of said inflator is covered with said applied cloth by making one side of said applied cloth an open hole and fixing edges of three other sides of said applied cloth to an outside face of said mounting base portion.

2. An air bag system according to claim 1, wherein said open hole is capable of being opened into an openmouthed shape.

3. An air bag system according to claim 1, wherein said applied cloth is mounted to said outside of said air bag such that said open hole on said one side is positioned on a side held by said inflator mounted in said air bag.

4. An air bag system according to claim 2, wherein said applied cloth is mounted to said outside of said air bag such that said open hole on said one side is positioned on a side held by said inflator mounted in said air bag.

5. An air bag system according to claim 1, wherein said insertion opening is formed of a slit formed in said mounting base portion of said air bag.

6. An air bag system according to claim 2, wherein said insertion opening is formed of a slit formed in said mounting base portion of said air bag.

7. An air bag system according to claim 3, wherein said insertion opening is formed of a slit formed in said mounting base portion of said air bag.

8. An air bag system according to claim 4, wherein said insertion opening is formed of a slit formed in said mounting base portion of said air bag.

* * * * *